United States Patent [19]

Little, Jr.

[11] Patent Number: 5,312,079

[45] Date of Patent: May 17, 1994

[54] UNIVERSAL C-CLAMP FOR STAGE ACCESSORIES

[76] Inventor: William D. Little, Jr., P.O. Box 541204, Dallas, Tex. 75354-1204

[21] Appl. No.: 12,652

[22] Filed: Feb. 3, 1993

[51] Int. Cl.⁵ .............................................. F21L 15/08
[52] U.S. Cl. ..................................... 248/230; 248/214; 248/231.7
[58] Field of Search ................... 248/230, 231.7, 228, 248/214, 62, 225.31, 316.1, 300

[56] References Cited

U.S. PATENT DOCUMENTS

| | | |
|---|---|---|
| D. 271,939 | 12/1983 | Little . |
| 1,651,457 | 12/1927 | Karnes ................... 248/231.7 X |
| 1,712,450 | 5/1929 | Cuno ...................... 248/231.7 X |
| 1,754,929 | 4/1930 | Atticks et al. ............. 248/230 |
| 3,425,127 | 2/1969 | Long et al. ............... 248/230 X |
| 3,784,140 | 1/1974 | Auerbach ................. 248/214 |
| 3,902,931 | 9/1975 | Danciger et al. ........... 248/231.7 X |
| 4,142,703 | 3/1979 | Moretto ................... 248/230 X |
| 4,733,879 | 3/1988 | Arenhold ................. 248/225.31 X |
| 4,832,299 | 5/1989 | Gorton et al. ............. 248/231.7 |
| 4,947,777 | 8/1990 | Yoder ..................... 248/231.7 X |
| 5,190,257 | 3/1993 | Gradei et al. ............. 248/231.7 |

FOREIGN PATENT DOCUMENTS 1287457 2/1962 France ....................... 248/230

*Primary Examiner*—David A. Scherbel
*Assistant Examiner*—Derek J. Berger
*Attorney, Agent, or Firm*—Dennis T. Griggs

[57] ABSTRACT

A C-clamp for mounting stage accessories has four angled body portions, with one body portion being bent to provide a first acute angle $\phi$ between the first and second body portions, and a second acute angle $\theta$ between the second and third body portions, and an approximately right angle $\alpha$ between the third and fourth body portions. The C-clamp has threaded holes in the first body portion and in the fourth body portion, respectively. The first acute angle is greater than the second acute angle. A tightening bolt in the first threaded hole is positioned to compress a pipe against the second and third body portions. Consequently, the tightening bolt can securely fasten the clamp onto support pipes of various sizes. A mounting bolt is inserted into the second threaded hole either to fasten the C-clamp to a support structure such as a ceiling joist so that the clamp can be used to support a pipe, or to fasten a stage accessory such as a flood light, spot projector or curtain to a pipe. Thus, one type of clamp can be used not only on a range of pipe sizes, but also both to support the pipe and to fasten stage accessories to the pipe.

11 Claims, 2 Drawing Sheets

UNIVERSAL C-CLAMP FOR STAGE ACCESSORIES

FIELD OF THE INVENTION

This invention relates generally to clamps for suspending stage accessories from a pipe, and more particularly to such clamps which can accommodate a range of pipe sizes.

BACKGROUND OF THE INVENTION

In stage or theater arrangements, pipes are used for supporting a variety of stage accessories. This permits stage accessories such as lighting fixtures or curtains to be conveniently rearranged as different productions are presented. According to conventional practice, one type of clamp has been used to suspend a pipe from a wall or ceiling, and a second type of clamp has been used to mount stage accessories on the pipe. Further, different size clamps (of both types) have been required for use with different size pipes. Generally, theaters use support pipes ranging from 1 inch to 2¼ inches I.D., with the O.D. being about ¼ inch greater than the I.D.

OBJECTS OF THE INVENTION

From the foregoing discussion, it can be seen that it has been necessary for theaters to stock several different types of clamps, leading to much longer times required to rearrange the theater for different stage productions. Accordingly, the principal object of the present invention is to provide a universal clamp for mounting stage accessories on a pipe.

A related object of the present invention is to provide a single clamp which can be used both to mount a pipe on a building structure and to mount stage accessories on the pipe.

Another object of this invention is to provide a single clamp which can be used not only in combination with a range of pipe sizes, but also both to support the pipe and to fasten stage accessories to the pipe.

Yet another object of this invention is to provide a clamp which allows horizontal mounting of relatively heavy accessories, such as large lighting fixtures, on a pipe, thus avoiding the normal requirement that heavier lighting fixtures hang approximately vertically from the pipe.

SUMMARY OF THE INVENTION

According to conventional practice, a number of sizes of clamps of one type have been required for supporting a pipe on a building structure and a number of sizes of clamps of a different type have been required for supporting accessories on the pipe. It has been found that a universal clamp can be used not only to support a range of pipe sizes, but also to support such pipes and to fasten stage accessories onto such pipes, if the clamping portions of the clamp bear a certain angular relationship with each other.

According to the present invention, the foregoing objects are achieved by a universal C-clamp for mounting stage accessories. Generally the clamp is in the form of a metal body member having first, second, third and fourth angled portions, with the body member having a first acute bend angle between the first and the second portions, and further having a second acute bend angle between the second and the third portions, and having an approximately right angle between the third and the fourth portions. The first acute angle is greater than the second acute angle, and the approximately right angle is greater than either of the acute angles. A tightening bolt is secured in a threaded hole in the first body portion and is positioned to compress a pipe against the second and third body portions. Consequently, the tightening bolt can securely fasten the clamp to a wide range of pipe sizes.

A mounting bolt is secured in a threaded hole formed in the fourth body portion for the purpose of fastening the clamp to a support structure such as a ceiling joist, so that the clamp supports the pipe, or for the purpose of fastening a stage accessory such as a flood light, spot projector or curtain to the pipe. Thus a single clamp can be used not only on a range of sizes of pipe, but also both to support the pipe and to fasten stage accessories to the pipe. In the preferred embodiment, the first acute angle is in the range of 80-84 degrees; the second acute angle is in the range of 78-81 degrees; and the approximately right angle is in the range of 88-92 degrees.

BRIEF DESCRIPTION OF THE DRAWINGS

Operational features and advantages of the present invention will be appreciated by those skilled in the art upon reading the detailed description which follows with reference to the attached drawings, wherein.

DESCRIPTION OF THE PREFERRED EMBODIMENT

Figure 1:
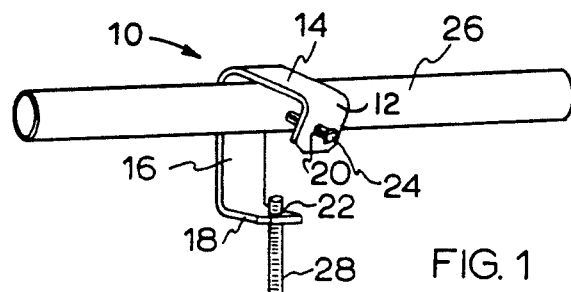
FIG. 1 is a perspective view a clamp being used to mount a stage lighting fixture on a pipe.

In the description which follows, like parts are indicated throughout the specification and drawings with the same reference numerals, respectively. The drawings are not necessarily to scale and the proportions of certain parts ma be exaggerated to better illustrate details of the invention.

Figure 2:
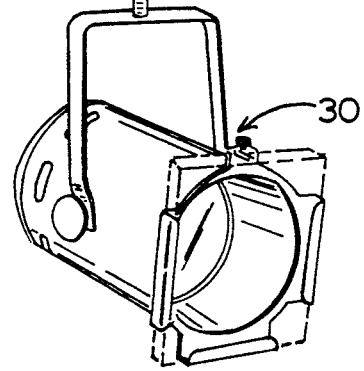
FIG. 2 is a side view of the assembly shown in FIG. 1.

FIGS. 1 and 2 illustrate the clamp utilized to support a lighting fixture from a pipe. The clamp 10 has a body member with first, second, third and fourth angled portions 12, 14, 16, 18, respectively. The body member has a first bend angle $\phi$ formed between the first and second portions 12, 14, a second acute bend angle $\phi$ formed between the second and third portions 14, 16, and an approximately right bend angle $\alpha$ formed between the third portion 16 and the fourth portion 18. The body member also has a first threaded hole 20 in the first portion 12 and a second threaded hole 22 in the fourth portion. The first acute bend angle $\phi$ is greater than the second acute bend angle $\theta$. A tightening bolt 24 in the first threaded hole 20 is positioned to push a pipe 26 against the second and third portions 14, 16. Thus, tightening the bolt 24 securely fastens the clamp 10 to a range of sizes of pipe. A mounting bolt 28 is shown inserted in the second threaded hole 22 to support a lighting fixture 30.

Figure 3:
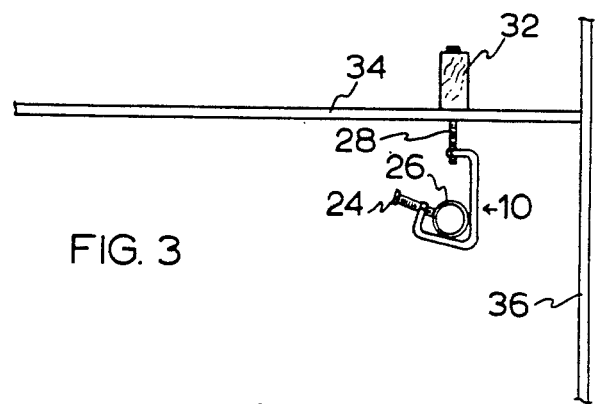
FIG. 3 shows a side elevation of a clamp mounted from the ceiling stud and supporting a pipe.

FIG. 3 shows a clamp 10 mounted to a mounting bolt 28 which is supported by a ceiling stud 32, hanging below a ceiling panel 34 (here adjacent to a wall 36).

Figure 4:
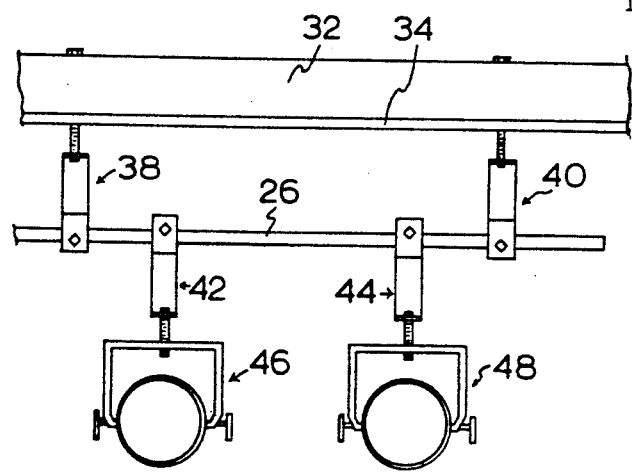
FIG. 4 is a front elevational view of the assembly shown in FIG. 3.

FIG. 4 shows a front view, with two clamps 38, 40 being used to mount the pipe 26, and two additional clamps 42, 44 being used, one for each of two lighting fixtures 46, 48. The clamps 38, 40, 42 and 44 each have identical construction as the clamp 10.

Figure 5:
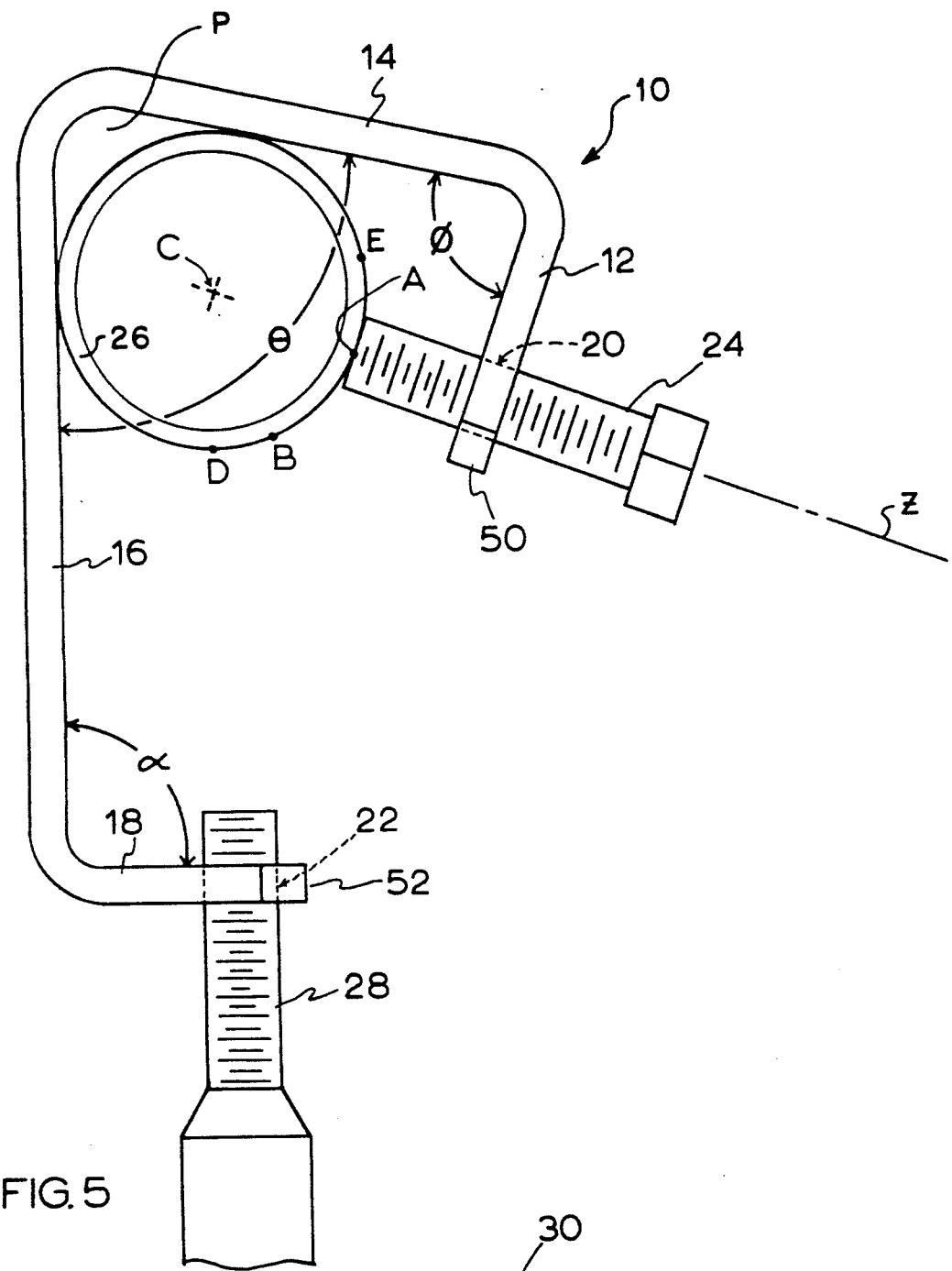
FIG. 5 shows a side view of a clamp.

FIG. 5 shows the clamp 10 in more detail and generally to scale. In particular, FIG. 5 shows the preferred embodiment in which angle $\phi$, between the first and second portions 12, 14, is 82 degrees, plus or minus 2 degrees. The angle $\theta$, between the second and third portions 14, 16, is preferably 78 degrees, plus 3 degrees, minus 0 degrees. The angle $\alpha$, between the third and fourth portions 16, 18, is preferably 90 degrees, plus or minus 2 degrees. By using the aforementioned angles, a wide variety of pipes can be accommodated, and the clamp 10 can be conveniently used either to support a pipe, or to support stage accessories from a pipe.

Preferably, the clamp body member is made of steel, and the first, second, third and fourth body portions 12, 14, 16, 18 are at least about ⅜ inch thick, and at least about 1¼ inches wide. The threaded holes 20, 22 are both at least about ⅜ inch in diameter. With such dimensions, with the first portion 12 being approximately 1⅝ inches long, with the centerline of the first threaded hole 20 about ½ inch from the end 50 of first portion 12, and with the second portion 14 being approximately 3⅝ inches long, and with the third portion 16 being approximately 5 inches long, and with the fourth portion being about 1¾ inches long, and with the second threaded hole 22 being approximately ½ inch from end 52 of the fourth portion 18, the clamp 10 can be used for pipes with an outer diameter measuring from about 1¼ inches and to about 2½ inches.

Figure 6:
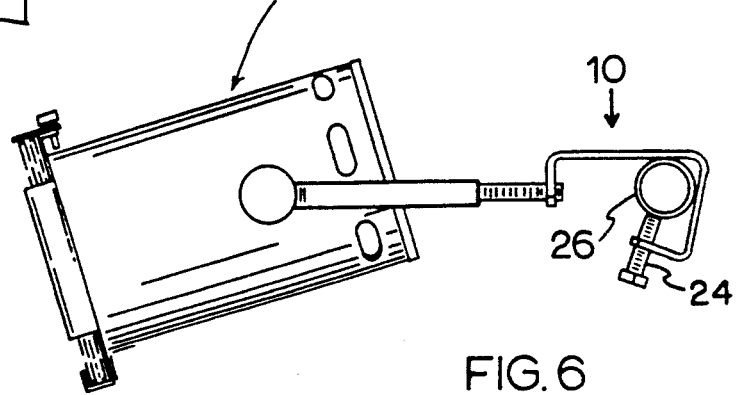
FIG. 6 shows a side view of a lighting fixture mounted horizontally from a pipe.

FIG. 6 shows a typical horizontal mounting. In such mountings, the clamp 10 with the preferred dimensions described above can be used to support loads of about 500 pounds. Conventional clamps are generally rated to hold less than 100 pounds when mounted in such a horizontal position.

Again with reference to FIG. 5, the centerline Z of the tightening bolt 24 should point either to the centerline of the pipe (thus touching the pipe about a point A), or to a point on the pipe between points A and B of FIG. 5. Thus, as shown, the tightening bolt 24 points approximately at the centerline of the pipe, with the centerline of the pipe extending through the points A and C. If a smaller but adequate size pipe were used in this clamp, the tightening bolt 24 would contact the pipe between points A and B, thus tending to drive the pipe into the pocket P between the angle arms 14, 16. If the tightening bolt should contact a very small pipe at, for example, point D, such pipe would be inappropriately small for the mounting clamp, and slipping would occur. Preferably, the tightening bolt 24 should not engage the pipe at a point above the centerline of the pipe 26, for example at point E, because the compression force exerted by the tightening bolt 24 would tend to drive the pipe 26 out of the pocket P, and no gripping action would occur.

Again, for the dimensions given, the clamp 10 fits onto pipes with an O.D. from 1¼ inches to 2½ inches. Such pipes used in theaters generally have a pipe wall thickness of about 1/8 inch.

It should be noted that conventional clamps cannot hang heavy accessories at other than near vertical orientations. Further, such conventional clamps tend to break when over-torqued, making it inconvenient to support even relatively light loads at angles other than near vertical. It should also be noted that being able to mount lighting fixtures in a horizontal position provides a great deal of flexibility, and accommodates stage arrangements in which other structures would otherwise block or interfere with the desired mounting or orientation of a stage accessory.

While the clamps have been described as a member having bend angles at three places, it can be seen that other methods of producing a clamp of generally these dimensions, and in particular, the desired angles, can be used. For example, clamps could be fabricated by casting. Further, while the clamps have generally been described as being steel, and steel is preferred as being inexpensive and effective, other metals such as aluminum could be utilized.

Although the invention has been described with reference to a specific embodiment, the foregoing description is not intended to be construed in a limiting sense. Various modifications to the disclosed structure and method, as well as alternative applications, will be suggested to persons in the art by the foregoing specification and illustrations. For example, the clamp could be scaled up or down for even larger or even smaller pipe (the angles, however, should generally remain the same). It is therefore contemplated that the appended claims will cover any such modifications, applications or embodiments which fall within the true scope of the invention.

What is claimed is:

1. A clamp for mounting stage accessories, said clamp comprising:
    a body member having first, second, third and fourth body portions, said body member having a first acute angle between said first and said second body portions, and having a second acute angle between said second and said third body portions, and having an approximately right angle between said third and said fourth body portions, and said member also having a first threaded hole in said first body portion, and with said first acute angle being greater than said second acute angle and with said approximately right angle being greater than either of said acute angles; and
    a tightening bolt disposed in said first threaded hole in said first body portion for engaging a pipe against the second and third body portions, whereby the tightening bolt can securely fasten the clamp onto pipes of various sizes.

2. A clamp as defined in claim 1, wherein said first acute angle is in the range of 80–84 degrees and said second acute angle is in the range of 78–81 degrees and said approximately right angle is 88–92 degrees.

3. A clamp as defined in claim 2, wherein said first, second, third and fourth body portions are at least about ⅜ inch thick and at least about 1¼ inches wide.

4. A clamp as defined in claim 3, wherein said first threaded hole is at least about ⅜ inch in diameter.

5. A clamp as defined in claim 1, said body member having a second threaded hole formed in said fourth body portion, wherein a mounting bolt is disposed in the second threaded hole in the fourth member to fasten the clamp to a ceiling joist and said tightening bolt fastens said clamp to a pipe.

6. A stage accessory mounting assembly, said assembly comprising:
    a pipe;
    at least a first clamp and a second clamp, each clamp including a body member having first, second, third and fourth body portions, said body member having a first acute angle between said first and said second body portions, and having a second acute angle formed between said second and said third body portions, and having an approximately right angle formed between said third and said fourth body portions, and said member also having a first threaded hole in said first body portion and a second threaded hole in said fourth body portion, with said first acute angle being greater than said second acute angle and with said approximately right angle being greater than either of said acute angles, and a tightening bolt disposed in said first threaded hole in said first portion for compressing a pipe against the second and third portions; an at least first and second mounting bolts attached to a support structure, and with said tightening bolts fastening said first and second clamps to said pipe and said first mounting bolt inserted into the second threaded hole of the first clamp and said second mounting bolt inserted into the second threaded hole of the second clamp to fasten the clamp to said support structure, thereby supporting said pipe.

7. A mounting assembly as defined in claim 6, including a third clamp constructed substantially the same as said first clamp and said second clamp, with a third tightening bolt disposed in a first threaded hole of said third clamp to fasten said third clamp to said pipe and with a third mounting bolt inserted into a second threaded hole of the third clamp, with said third mounting bolt attached to a stage accessory.

8. The assembly of claim 7, wherein said first acute angle of said clamps is in the range of 80-84 degrees and said second acute angle of said clamps is in the range of 78-81 degrees and said approximately right angle of said clamps is in the range of 88-92 degrees.

9. The assembly of claim 8, wherein said first, second, third and fourth portions of said clamps are at least about ⅜ inch thick and at least about 1¼ inches wide.

10. The assembly of claim 9, wherein said first threaded holes of said clamps and said second threaded holes of said clamps are all at least about ⅜ inch in diameter.

11. The assembly of claim 10, wherein said pipe has an outer diameter of between about 1¼ and 2½ inches and a wall having a thickness of about ⅛ inch.

* * * * *